United States Patent
Lipschutz et al.

[11] 3,887,029
[45] June 3, 1975

[54] ANTI-THEFT DEVICES

[75] Inventors: Paul Lipschutz, Croissy-Sur-Seine; Jean Leroy, Saint-Cyr-L'Ecole, both of France

[73] Assignee: Societe d'Exploitation des Brevets Neiman, Neuilly s/Seine, France

[22] Filed: Oct. 17, 1973

[21] Appl. No.: 407,405

Related U.S. Application Data

[60] Division of Ser. No. 182,385, Sept. 21, 1971, Pat. No. 3,782,493, which is a continuation-in-part of Ser. No. 47,706, June 19, 1970, Pat. No. 3,688,861.

[30] Foreign Application Priority Data
Sept. 28, 1970  France .............................. 70.34733

[52] U.S. Cl. ..................... 180/114; 70/252; 70/254; 70/255; 70/265; 123/198 D; 307/10 AT
[51] Int. Cl. ............................................. B60r 25/02
[58] Field of Search ........... 180/114, 111, 112, 113; 70/252, 254, 255, 265, 283; 123/198 D, 198 B; 307/10 AT

[56] References Cited
UNITED STATES PATENTS

| | | | |
|---|---|---|---|
| 3,021,913 | 2/1962 | Ouimet et al. | 180/114 |
| 3,398,731 | 8/1968 | Johansson | 123/198 D |
| 3,426,560 | 2/1969 | Dwan | 180/114 |
| 3,622,718 | 11/1971 | Lipschutz | 70/252 |
| 3,641,489 | 2/1972 | Shimomura | 180/114 |

*Primary Examiner*—David Schonberg
*Assistant Examiner*—John P. Silverstrim
*Attorney, Agent, or Firm*—Nolte and Nolte

[57] ABSTRACT

A lock having a bolt engageable with a control element of an automotive vehicle and including key-operated means having a first position in which the bolt is engaged with the control element and a second position in which the bolt is disengaged therefrom, means for blocking movement of the key-operated means between both positions, and comprising an electromagnet energizable by an electrical circuit of the automotive vehicle for operating said blocking means.

5 Claims, 3 Drawing Figures

ANTI-THEFT DEVICES

This is a divisional application of the continuation-in-part Ser. No. 182,385 filed on Sept. 21, 1971 (now U.S. Pat. No. 3,782,493) of the U.S. patent application Ser. No. 47,706 filed on June 19, 1970 now U.S. Pat. No. 3,688,861.

The present invention relates to anti-theft devices particularly applicable to automotive vehicles powered by an internal combustion engine, such anti-theft devices being adapted to prevent operating the start of the engine when the anti-theft device is in the locking position and to lock the anti-theft device when the engine is running, respectively.

Such devices are already provided for vehicles driven by non-Diesel type internal combustion engines and generally comprise a switch operatively connected to the safety lock of the anti-theft device, so as to prevent the ignition coil from being energized when the anti-theft device is in the locking position. These devices cannot be applied to a Diesel engine-driven vehicle which does not comprise any ignition coil.

The object of the invention is therefore to improve the existing anti-theft arrangements so that same be applicable to a Diesel engine-powered automotive vehicle and the invention suggests for this purpose an anti-theft device with a safety lock having a bolt adapted to engage some control element or working part of an automotive vehicle, the lock including key-operated means adapted to assume a first position in which said bolt engages said control element and a second position in which the bolt is disengaged from said control element, and with blocking means adapted to block the movement of said key-operated means, the improvement consisting in that said blocking means are operatively connected to said engine starting means to respond to the engine starting position of said engine starting means to block the movement of said key-operated means from said second to said first position, and to respond to the non-starting position of said engine starting means to permit movement of said key-operating means between said two positions.

According to the present embodiment of the invention said blocking means are constituted of an electromagnet and a movable core, and said engine starting means are operatively coupled to a first switch having in response to the engine starting position of said starting means a first position in which it is placed in an electrical circuit carrying the operating current for said vehicle and including a second switch operatively coupled to said key-operated means and a second position for energizing said electromagnet.

The invention will be better understood and other objects, characterizing features, details and advantages thereof will appear more clearly as the following explanatory description proceeds with reference to the accompanying diagrammatic drawings illustrating one embodiment of the invention and wherein:

FIG. 1 is a sectional view of an anti-theft device according to the invention mounted on the steering column of an automotive vehicle, with blocking means such as described in the original application Ser. No. 47,706 and in the continuation-in-part Ser. No. 182,385;

Figure 1:
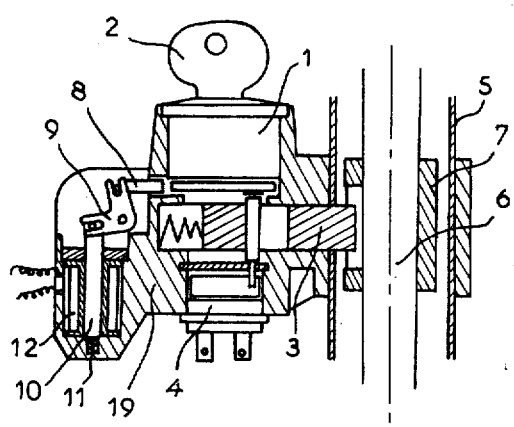

In FIG. 1 is shown the structure of the safety lock 1 of an anti-theft device provided with its key 2. The blocking means shown in this Figure relate to the embodiment of the invention disclosed in the original patent application Ser. No. 47,706 filed on June 19, 1970, from which the parent application of the present divisional application is a continuation-in-part, and are described here only as far as necessary for the understanding of the present embodiment of the invention. Through rotation of the key 2, the finger 4a of the rotor of the lock 1 moves the bolt 3 along together with the electric switch 4 provided below. The bolt 3 engages in the usual manner an opening forming a bolt-clasp or like strike-box formed in the ring or collar 7 fastened to the steering column 6 of the vehicle, the casing 19 of the anti-theft device being secured to the tube 5 of the steering column 6.

A housing or like recess formed in the casing 19 of the anti-theft device accommodates the long-pull electromagnet 12 together with its plunger core 10 which is urged or retractable upwards by a biasing drawback spring 11 when the electromagnet is not energized, that end of said core which is opposite to said biasing spring being connected to the lower arm of a cranked lever 9 bent at right angles the other end of which actuates a lock or like latch means 8.

The spring 11 is effective to constantly urge or push the end of the latch 8 to bear against the periphery of a circular base or plate 13 integral with the rotor of the safety lock of the anti-theft device. This base or plate 13 is formed with a notch 13' engageable by the end of the latch 8 when the latter is registering therewith.

Figure 2:
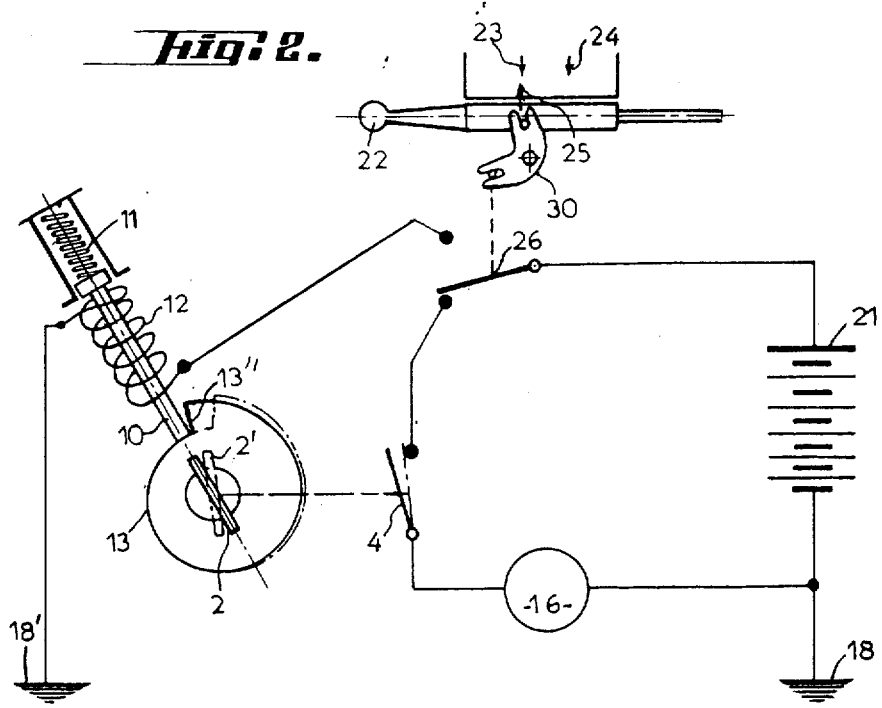
FIG. 2 is a diagram of an embodiment of the invention shown in the position when the engine is running.
Figure 3:
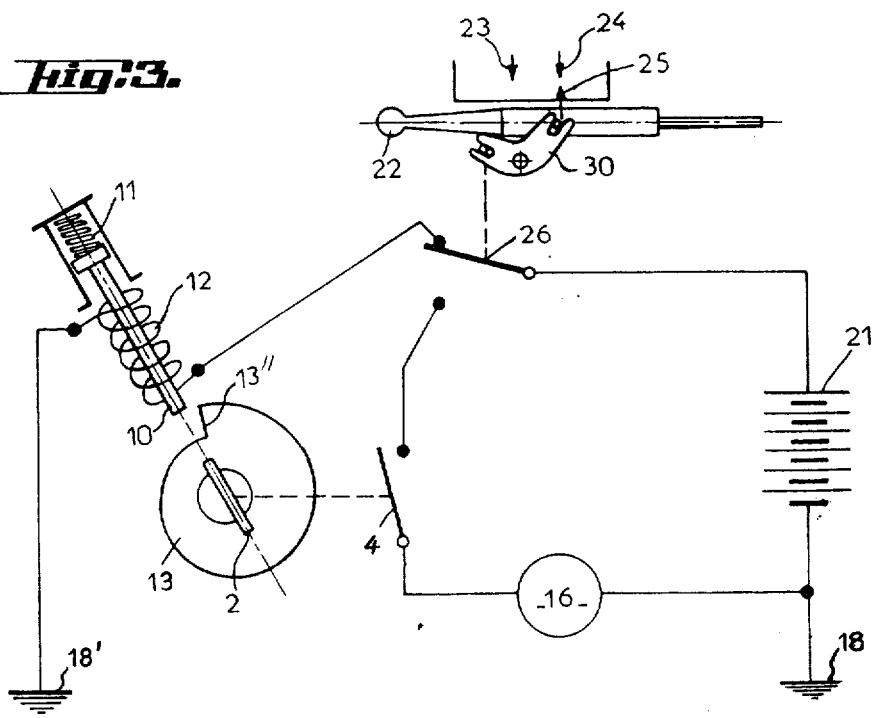
FIG. 3 is a view corresponding to FIG. 2, showing the position when the engine of the vehicle is at rest.

The embodiment of the present divisional application is shown in FIGS. 2 and 3. This embodiment of the invention relates more particularly to the case where a connection is provided between the anti-theft device and the control means of the injection pump of the engine or the decompression control means.

In these Figures, the reference numeral 22 designates the pull handle or operating lever for controlling the injection pump or for actuating the decompression of the engine. This lever 22 carries a mark 25 the position of which is defined with respect to two stationary marks 23 and 24, the mark 23 corresponding to the position of the movable mark 25 when the engine is running and the mark 24 corresponding to the position of the movable mark 25 when the engine is stopped.

In both of these particular embodiments, the base 13, which is rotatably driven by the key 2, exhibits a nose or like shoulder 13" adapted to abut against the core 10 of the electromagnet 12, said core 10 being urged by the spring 11 against the pull exerted upon said core when the electromagnet 12 is energized.

In the embodiment shown in FIGS. 2 and 3, the lever 22 is operatively connected by a connecting member 30 to an electrical change-over switch 26 which is connected on the one hand to the storage battery 21 of the vehicle and on the other hand either to the electromagnet 12 or to the starter 16 for the vehicle engine. Thus the electromagnet 12 is energized by the storage battery 21 when the throw-over switch 26 is in the upper position shown in the drawing whereas the starter 16 is connected to the storage battery when the throw-over switch 26 is in its lower position and the switch 4 actuated by the anti-theft device is closed.

The operation of the change-over switch 26 is mechanically effected by said connecting member 30 consisting for instance of a cranked part bent at right angles one arm of which is connected to the change-over switch 26 whereas the other arm is connected to the lever 22.

Any other mechanical system kinematically converting the translatory motion of the lever 22 into a motion actuating the change-over switch 26 may also be used.

When the anti-theft device is in the unlocked position that is when it does not lock the steering column and when the lever 22 is in the "running" position (mark 25 registering with mark 23), the electromagnet 12 is not energized and the movable core 10 thereof bears against the base 13 as shown in FIG. 2. The nose 13″ when abutting against the movable core 10 prevents any rotation of the base 13 in the counter-clockwise direction and thereby prevents any locking of the anti-theft device. Such a position of the anti-theft device corresponds to the normal running of the engine.

The start of the engine is effected as follows: the lever 22 is pulled until mark 25 registers with mark 23, the change-over switch 26 is closed to complete the feed circuit for the starter 16 and the electromagnet 12 is not energized. The rotation of the key 2 causes the switch 4 to be closed, this corresponding to the "start" position of the rotor of the anti-theft device. The starter 16 is then fed with power by the electrical circuit comprising the storage battery 21, the change-over switch 26, the switch 4 and the ground 18'. When the engine has been started, the driver releases the key 2 of the anti-theft device which is moved resiliently back to the position corresponding to the normal running of the engine, whereby the switch 4 is opened and cuts off the feed circuit for the starter 16. The electromagnet 12 is not energized and the movable core 10 thereof thus prevents any locking of the anti-theft device. Conversely the engine is stopped by pushing the lever 22 back until the mark 25 registers with the mark 24 as shown in FIG. 3. The change-over switch 26 has then been moved to the upper position in the drawing and the electromagnet 12 is energized. The movable core 10 is then caused to be retracted against the action exerted by the spring 11 thereby disengaging the nose 13″ of the base 13 and enabling to lock the anti-theft device. When the key 2 is withdrawn from the safety lock of the anti-theft device, the bolt of said lock is then moved to the extended position to lock the steering column as previously stated.

It is to be understood that the part of the engine starting means which is operatively coupled to change-over switch 26 may comprise a control lever for controlling pressure releasing means or injection pump means included in the Diesel engine.

The invention also provides cut-off means for the circuit feeding the electromagnet 12, which have not been shown in the drawings so as to avoid keeping any live voltage applied to said electromagnet 12 when the vehicle has been left in a parking place.

It should be understood that the invention is not at all limited to the forms of embodiment described and shown which have been given by way of examples only. In particular it comprises all the means forming technical equivalents to the means described as well as their combinations if same are carried out according to the gist of the invention as defined in the appended claims.

What is claimed is:

1. In an anti-theft device having a lock including key-operated means, a bolt adapted to engage a control element of an automotive vehicle with a Diesel engine and with mechanical engine starting means, said lock including key-operated means having a first position in which the bolt is engaged with the control element and a second position in which the bolt is disengaged from said control element, and blocking means adapted to block the movement of said key-operating means, the improvement consisting in that said device comprises means for operatively connecting said blocking means to said engine starting means, said connecting means being responsive to the engine starting position of said engine starting means to block the movement of said key-operated means from said second into said first position, and responsive to the non-starting position of said engine starting means to permit movement of said key-operated means between said two positions.

2. Anti-theft device according to claim 1, wherein said blocking means are constituted of an electromagnet and a movable core and said connecting means comprises a first switch movable in response to the engine starting position of said starting means to a first position in which it is placed in an electrical circuit carrying the operating current for said vehicle and including a second switch operatively coupled to said key-operated means, and in response to the non-engine starting position of said starting means to a second position in which it closes the energizing circuit of said electromagnet.

3. Anti-theft device according to claim 2 for an automotive vehicle with a Diesel engine including injection pump means controllable by a control lever, wherein said engine starting means comprises said control lever operatively associated with said first switch.

4. Anti-theft device according to claim 2 for an automotive vehicle with a Diesel engine including pressure releasing means controllable by a control lever, wherein said engine starting means comprises said control lever operatively associated with said first switch.

5. Anti-theft device according to claim 1 and having key-operated means comprising a rotor for moving said bolt into engaged relationship with said control element and a circular plate integral with said rotor, wherein said plate exhibits a nose adapted to abut against said core of said electromagnet, when said electromagnet is energized and said rotor is rotated.

* * * * *